US010677672B2

(12) United States Patent
Sakano et al.

(10) Patent No.: US 10,677,672 B2
(45) Date of Patent: Jun. 9, 2020

(54) DISPLACEMENT DETECTION TYPE FORCE-DETECTION STRUCTURE AND DISPLACEMENT DETECTION TYPE FORCE SENSOR

(71) Applicant: FANUC CORPORATION, Yamanashi (JP)

(72) Inventors: Tetsuro Sakano, Yamanashi (JP); Shunichi Odaka, Yamanashi (JP)

(73) Assignee: FANUC CORPORATION, Yamanashi (JP)

( * ) Notice: Subject to any disclaimer, the term of this patent is extended or adjusted under 35 U.S.C. 154(b) by 0 days.

(21) Appl. No.: 16/200,651

(22) Filed: Nov. 27, 2018

(65) Prior Publication Data

US 2019/0162613 A1 May 30, 2019

(30) Foreign Application Priority Data

Nov. 28, 2017 (JP) ................................. 2017-227703

(51) Int. Cl.
*G01L 5/165* (2020.01)
*G01L 1/14* (2006.01)

(52) U.S. Cl.
CPC .............. *G01L 5/165* (2013.01); *G01L 1/142* (2013.01)

(58) Field of Classification Search
CPC ................................ G01L 5/165; G01L 1/142
USPC ....................................... 73/862.041–862.046
See application file for complete search history.

(56) References Cited

U.S. PATENT DOCUMENTS

| 4,674,339 A * | 6/1987 | Hatamura | G01L 5/161 |
|---|---|---|---|
| | | | 73/862.042 |
| 7,437,954 B2 * | 10/2008 | Sakano | G01L 5/161 |
| | | | 73/862.043 |
| 8,408,075 B2 * | 4/2013 | Okada | G01L 5/165 |
| | | | 73/862.043 |
| 9,200,969 B2 * | 12/2015 | Ueno | G01L 5/16 |
| 9,638,594 B2 * | 5/2017 | Sakano | G01L 5/165 |
| 2016/0062387 A1 | 3/2016 | Boughtwood | |

(Continued)

FOREIGN PATENT DOCUMENTS

| CN | 105466611 A | 4/2016 |
|---|---|---|
| CN | 106969864 A | 7/2017 |

(Continued)

*Primary Examiner* — Octavia Hollington
(74) *Attorney, Agent, or Firm* — Hauptman Ham, LLP

(57) ABSTRACT

A displacement detection type force-detection structure. The force-detection structure includes a first end portion; a second end portion; a connecting portion elastically connecting the first and second end portions with three degrees of freedom; a detecting part detecting relative displacement between the first and second end portions accompanied by elastic deformation of the connecting portion. The detecting part includes a first differentially-detecting section detecting a relative movement between the first and second end portions along a first axis as first movement data by using signals reverse in phase; a second differentially-detecting section detecting a relative movement between the first and second end portions along a second axis as second movement data by using signals reverse in phase; and a third differentially-detecting section detecting a relative rotation between the first and second end portions about a central axis along a third axis as rotation data by using signals reverse in phase.

7 Claims, 16 Drawing Sheets

(56) References Cited

U.S. PATENT DOCUMENTS

2019/0162612 A1* 5/2019 Sakano ............... G01L 5/165
2019/0360879 A1* 11/2019 Iwatake ............... G01L 1/142

FOREIGN PATENT DOCUMENTS

| | | | |
|---|---|---|---|
| JP | 2004-301731 | A | 10/2004 |
| JP | 2011-128096 | A | 6/2011 |
| JP | 2012-145497 | A | 8/2012 |
| JP | 2013-40869 | A | 2/2013 |
| JP | 2016-42044 | A | 3/2016 |
| JP | 2016-70824 | A | 5/2016 |
| KR | 10-1470160 | B1 | 12/2014 |
| WO | 2015/008393 | A1 | 1/2015 |

* cited by examiner

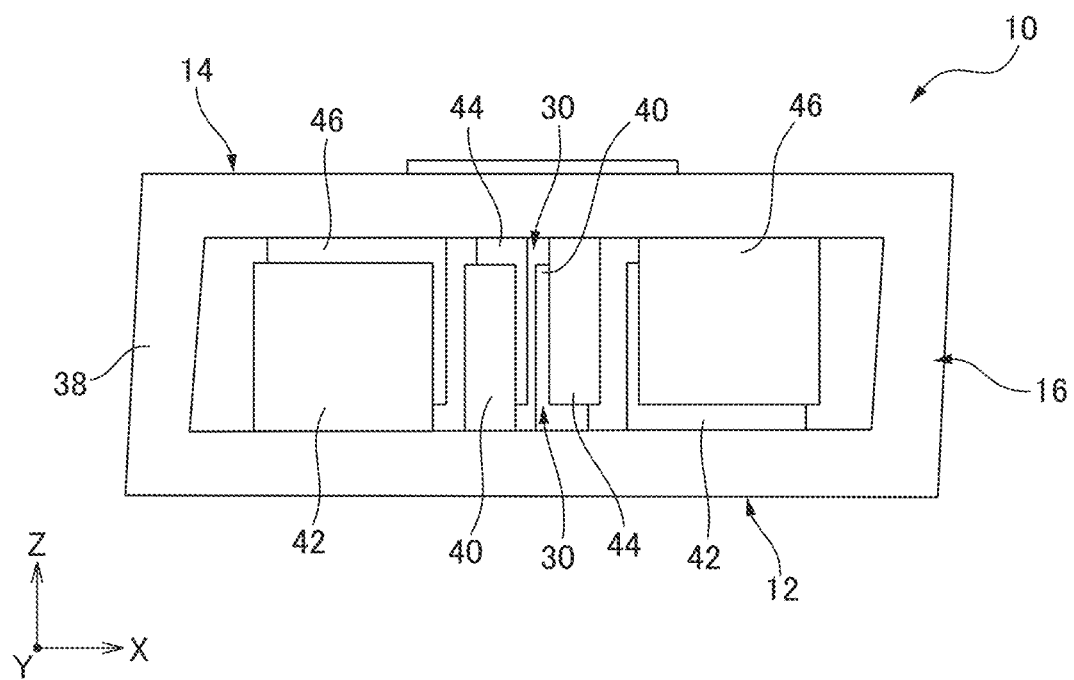

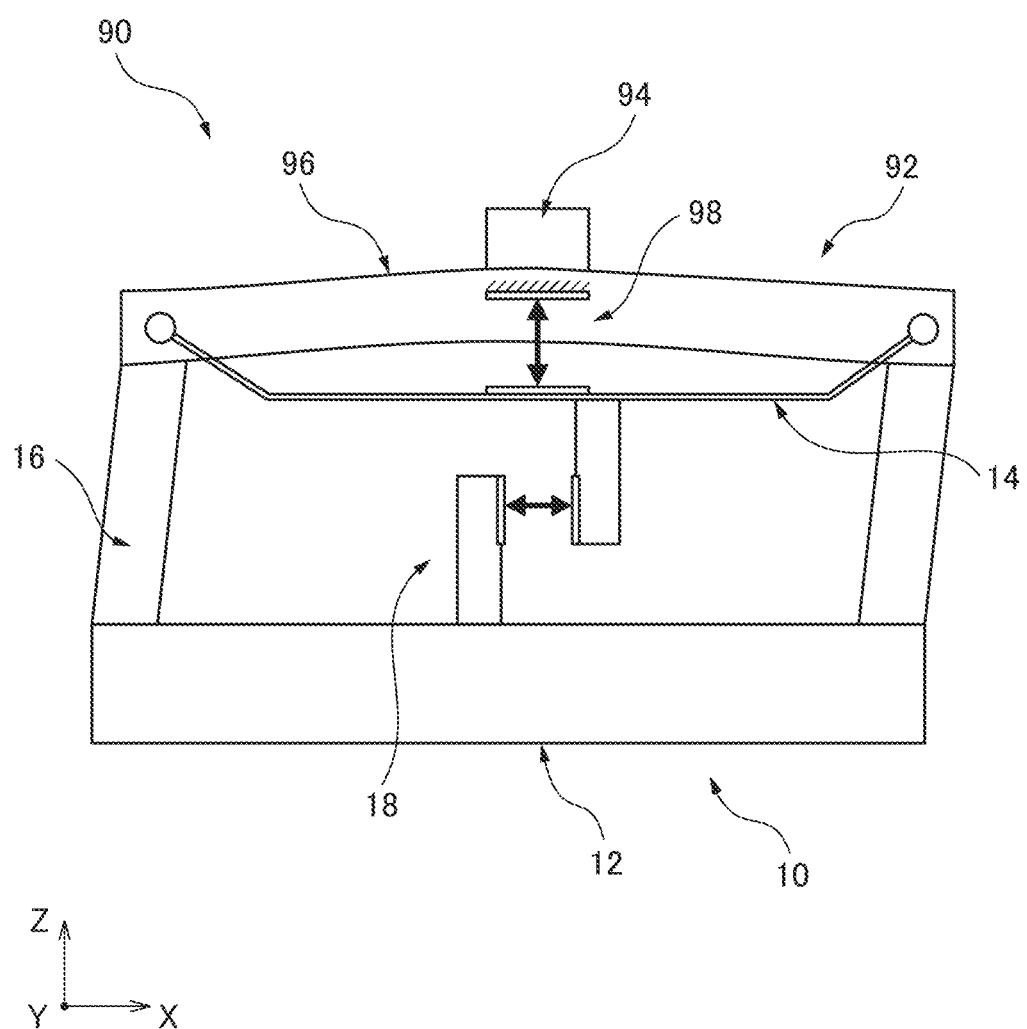

DISPLACEMENT DETECTION TYPE FORCE-DETECTION STRUCTURE AND DISPLACEMENT DETECTION TYPE FORCE SENSOR

RELATED APPLICATIONS

The present application claims priority of Japanese Application Number 2017-227703, filed on Nov. 28, 2017, the disclosure of which is hereby incorporated by reference herein in its entirety.

BACKGROUND OF THE INVENTION

1. Field of the Invention

The present invention relates to a displacement detection type force-detection structure. The present invention also relates to a force sensor including a displacement detection type force-detection structure.

2. Description of the Related Art

A displacement detection type force sensor is configured to detect, when a force (or load) is applied to a constituent element thereof, a displacement of the constituent element accompanied by the deformation of the constituent element caused by the applied force and thereby detect the force based on the detected displacement amount. For example, Japanese Unexamined Patent Publication No. 2004-301731 (JP 2004-301731 A) discloses a force sensor which detects a displacement amount by detecting a change in capacitance provided at a predetermined position on a sensor body. The force sensor includes an outer box-shaped structure and an inner box-shaped structure. The side and top surfaces of the outer box-shaped structure are opposed to the side and top surfaces of the inner box-shaped structure, respectively, and a gap is formed therebetween so as to continuously extend throughout the sensor body. A plurality of pairs of electrodes are respectively arranged at predetermined locations in the gap in such a manner that the electrodes of each pair are opposed to each other in a direction of any one axis of a three-axis rectangular coordinate system, so as to form capacitance between the opposing electrodes of each pair (i.e., to form a capacitor). When the outer box-shaped structure is deformed by a force (or load), the shape and dimensions of the gap change correspondingly, and the capacitance between the respective opposing electrodes changes. The force sensor is configured to calculate, from the change in capacitance, a displacement amount of the outer box-shaped structure relative to the inner box-shaped structure, and detect, based on the calculated displacement amount, a force component in a direction of each axis and a moment component about each axis, of the force applied to the outside box-shaped structure.

On the other hand, Japanese Unexamined Patent Publication No. 2016-070824 (JP 2016-070824 A) discloses a displacement detection type six-axis force sensor configured to detect, in a three-axis rectangular coordinate system, a force component in a direction of each axis and a moment component about each axis, wherein a first detecting part and a second detecting part detect the force and moment components in a sharing manner, with the first detecting part being allocated to three axes and the second detecting part being allocated to the other three axes.

SUMMARY OF INVENTION

In a displacement detection type force-detection structure and a displacement detection type force sensor, which detect a displacement of a constituent element accompanied by a deformation of the constituent element caused by a force and thereby acquire force and moment components relating to three or more axes, it is desired to prevent a variation (referred to as a "drift", in the present disclosure) of a detection value in a case where the constituent element undergoes a deformation or a characteristic change due to environmental factors other than a force, such as a temperature or humidity.

One aspect of the present disclosure provides a force-detection structure comprising a first end portion; a second end portion; a connecting portion that elastically connects the first end portion to the second end portion; a detecting part that detects a relative displacement between the first end portion and the second end portion, accompanied by elastic deformation of the connecting portion, and outputs, based on the said relative displacement, a detection value used for acquiring a first force component in a direction of a first axis, a second force component in a direction of a second axis orthogonal to the first axis, and a moment component about a third axis orthogonal to both of the first axis and the second axis, of a force applied to the first end portion or the second end portion; wherein the detecting part comprises a first differentially-detecting section that detects, in a differential manner, a relative movement between the first end portion and the second end portion along the first axis as first movement data by using signals mutually reverse in phase; a second differentially-detecting section that detects, in a differential manner, a relative movement between the first end portion and the second end portion along the second axis as second movement data by using signals mutually reverse in phase; and a third differentially-detecting section that detects, in a differential manner, a relative rotation between the first end portion and the second end portion about a central axis along the third axis as rotation data by using signals mutually reverse in phase, so that the detecting part outputs the detection value based on the first movement data, the second movement data and the rotation data.

Another aspect of the present disclosure provides a force sensor including the above-described force-detection structure.

In the force-detection structure of the above aspect, the first differentially-detecting section, the second differentially-detecting section and the third differentially-detecting section, of the detecting part, detect, in the differential manner, the first movement data, the second movement data and the rotation data, so that, a variation in signals, which results from changes in dimension, etc., of the first gap and the second gap caused by environmental factors other than a force, is canceled by a difference between the signals reverse in phase. Consequently, in the force-detection structure, even when a constituent element (in particular, a constituent element of the detecting part) undergoes a deformation or a characteristic change due to environmental factors other than a force, such as a temperature or humidity, it is possible to detect the first movement data, the second movement data and the rotation data, which exactly represent a displacement due to the force, and thereby improve the accuracy and precision of the detection value.

According to the force sensor of the other aspect, due to the provision of the force-detection structure, it is possible to improve the accuracy and precision of the detection value output from the detecting part.

BRIEF DESCRIPTION OF THE DRAWINGS

The objects, features and advantages of the present disclosure will become more apparent from the following description of the embodiments in connection with the accompanying drawings, wherein:

FIG. 4B is a front view corresponding to FIG. 2, and illustrating the displacement motion of FIG. 4A;

FIG. 11 is a front view conceptually and schematically illustrating a configuration of a six-axis force sensor including the force-detection structure of FIG. 1;

DETAILED DESCRIPTION

Figure 1:
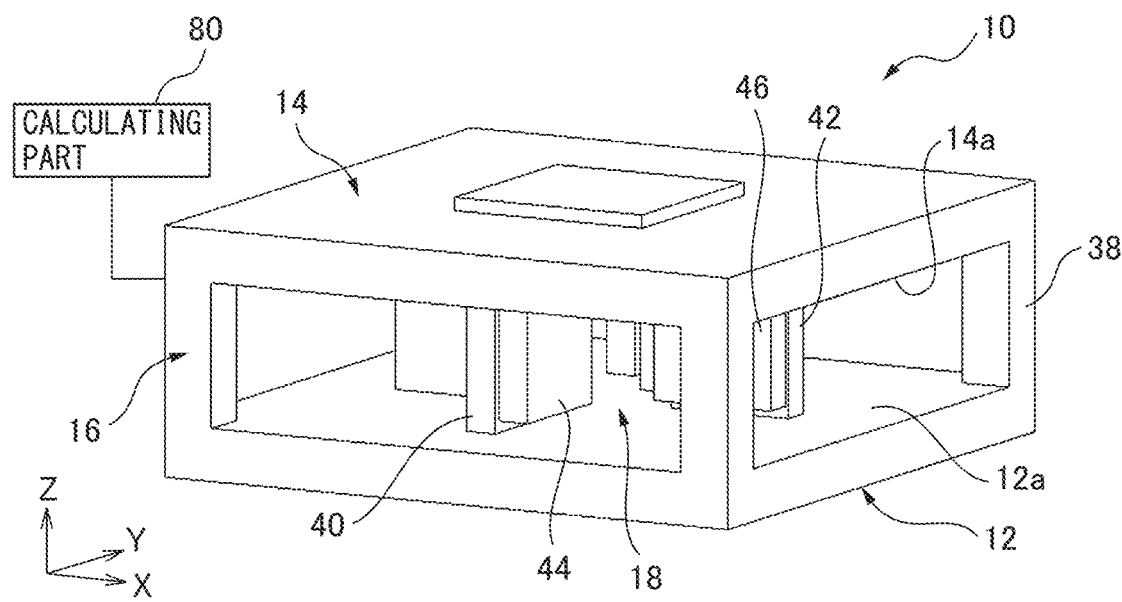
FIG. 1 is a perspective view illustrating an entire configuration of a force-detection structure according to a first embodiment.

Embodiments of the present disclosure will be described below with reference to the accompanying drawings. Throughout the drawings, corresponding constituent elements are denoted by common reference numerals.

Figure 2:
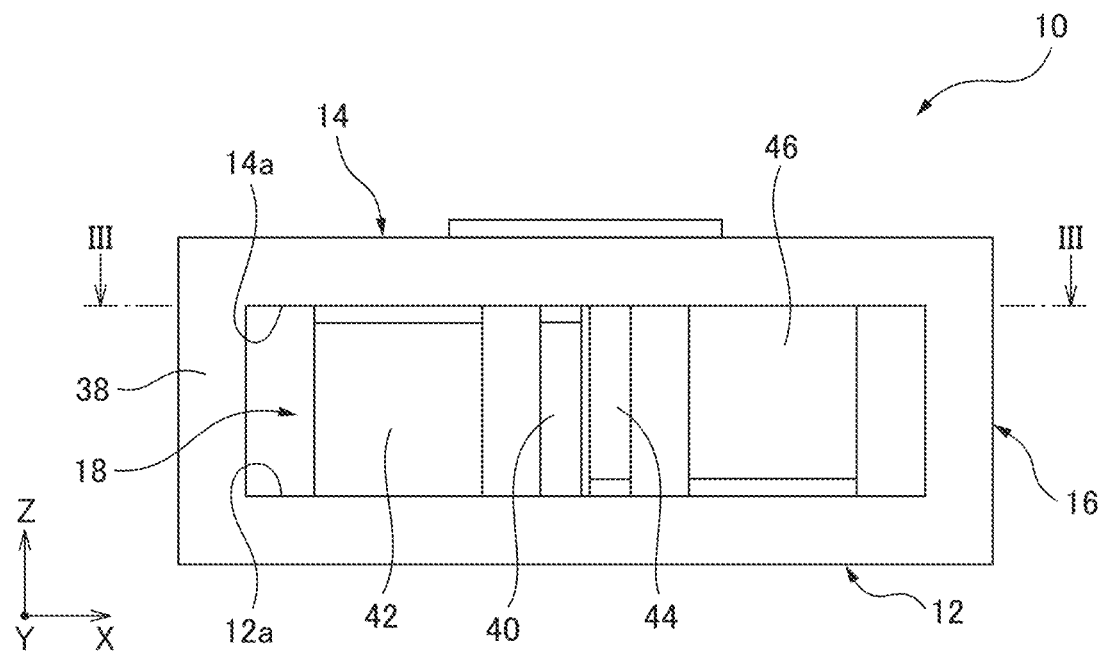
FIG. 2 is a front view of the force-detection structure of FIG. 1.
Figure 3:
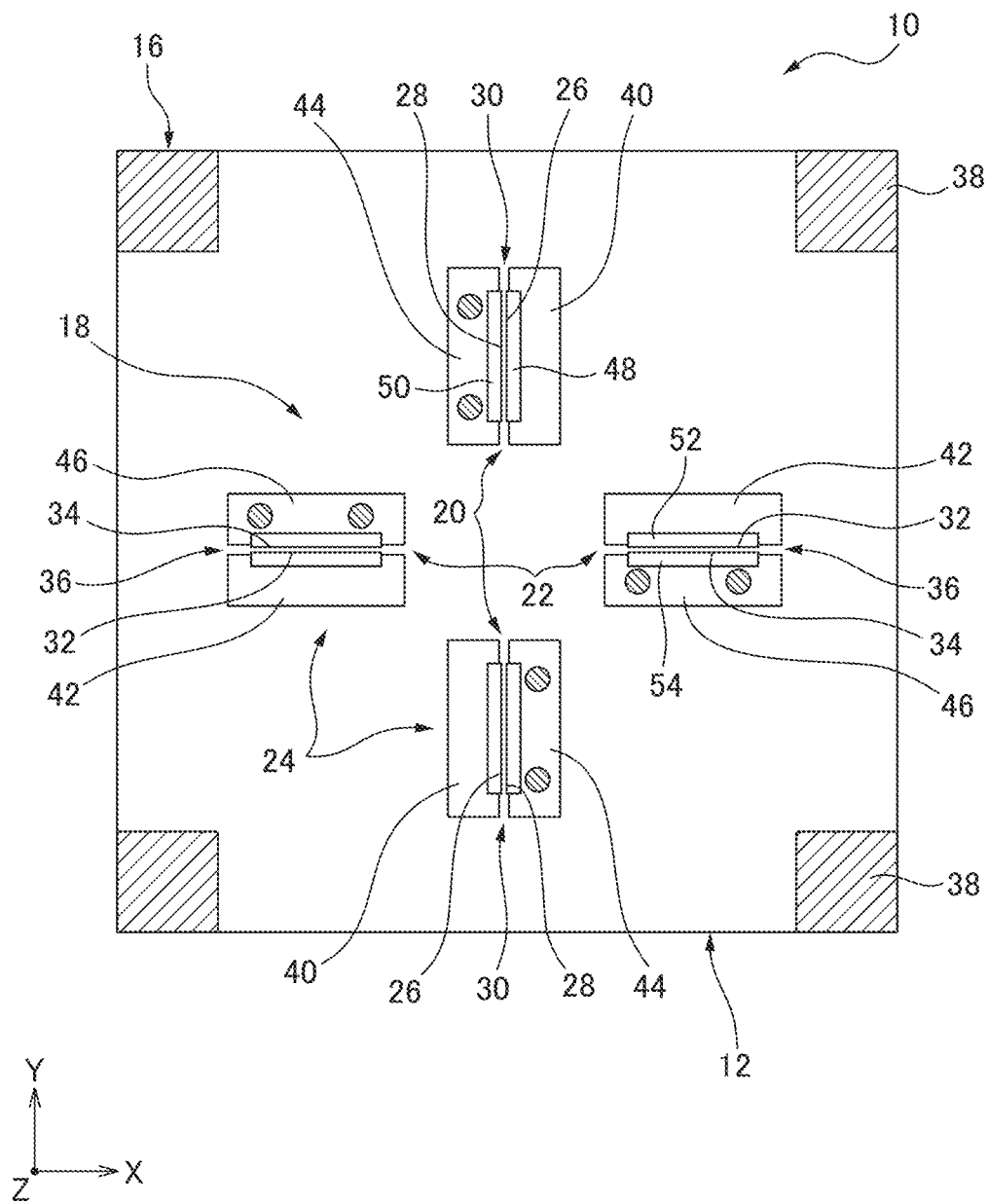
FIG. 3 is a sectional view of the force-detection structure, taken along line III-III in FIG. 2.

FIGS. 1 to 3 illustrate an entire configuration of a force-detection structure 10 according to a first embodiment. The force-detection structure 10 includes a first end portion 12; a second end portion 14; a connecting portion 16 which elastically connects the first end portion 12 to the second end portion 14 with three degrees of freedom; and a detecting part 18 which detects a relative displacement between the first end portion 12 and the second end portion 14, the relative displacement accompanied by the elastic deformation of the connecting portion 16.

Each of the first end portion 12 and the second end portion 14 may be configured as a base element that is directly or indirectly fixed to a machine or structure such as a robot arm (not illustrated; hereinafter referred to as a machinery) when the force-detection structure 10 is mounted on the machinery. Each of the first end portion 12 and the second end portion 14 may also be configured as a force receiving element that is attached to an object such as a robot hand (not illustrated; hereinafter referred to as a force generator) generating a force (or load) to be detected by the force-detection structure 10, and receives the force to be detected. The force-detection structure 10 can be used in such a manner that one of the first end portion 12 and the second end portion 14 is arranged as the base element and the other is arranged as the force receiving element.

For example, in a case where the first end portion 12 is used as the base element and the second end portion 14 is used as the force receiving element, the force (or load) applied from the force generator to the second end portion 14 is then applied from the second end portion 14 to the connecting portion 16. The applied force elastically deforms the connecting portion 16, and at the same time, causes the second end portion 14 to be elastically displaced relative to the first end portion 12 in a direction defined as the predetermined three degrees of freedom.

For example, in a configuration wherein a three-axis rectangular coordinate system (X-Y-Z) is defined in space as illustrated in the several drawings, the first end portion 12 and the second end portion 14 are configured in such a manner as to be able to relatively move in a direction along a first axis (or X axis), relatively move in a direction along a second axis (or Y axis), and relatively rotate about a central axis along a third axis (or Z axis), while accompanied by the elastic deformation of the connecting portion 16. In this configuration, the three degrees of freedom are defined by a movement in the direction along each of the first (X) and second (Y) axes and a rotation about the central axis along the third (Z) axis. The first end portion 12 and the second end portion 14 can be displaced relative to each other in any one direction or in a combination of two or more directions, from among the above three directions, depending on the force applied to the first end portion 12 or the second end portion 14.

It should be noted that, in the present disclosure, the expression "along . . . " is a term for representing an approximate directionality by using any one of axes of a coordinate system, and covers a configuration as to be parallel to an axis, a configuration as to slightly deviate from the parallel configuration (i.e., substantially parallel to an axis), and a configuration as to intersect an axis at, e.g., 45 degrees or less angle.

The detecting part 18 detects a relative displacement (or an amount of displacement due to a relative motion) between the first end portion 12 and the second end portion 14 in connection with the aforementioned three directions. The detecting part 18 outputs, based on the detected relative displacement in three directions, a detection value D used for acquiring a first force component in the direction of a first axis (X axis, in the drawing), a second force component in the direction of a second axis (Y axis, in the drawing) orthogonal to the first axis, and a third moment component about a third axis (Z axis, in the drawing) orthogonal to both of the first axis and the second axis, of the force applied to the first end portion 12 or the second end portion 14.

The force-detection structure 10 may be used as a three-axis force sensor capable of detecting force components in the directions of two axes and a moment component about one axis in a manner as described above. Alternatively, the force-detection structure 10 may be combined with an additional detection structure capable of detecting the other component(s) relating to one or more axes, so as to constitute an at-least-four-axis force sensor. In this configuration, the first end portion 12 or the second end portion 14 can be used as a force input portion or a force output portion relative to the additional detection structure. A configuration of such an at-least-four-axis force sensor will be described later.

The detecting part 18 includes a first differentially-detecting section 20 which detects, in a differential manner, a relative movement between the first end portion 12 and the second end portion 14 along the first axis (X axis, in the drawing) as first movement data d1 by using signals mutually reverse in phase; a second differentially-detecting section 22 which detects, in a differential manner, a relative movement between the first end portion 12 and the second end portion 14 along the second axis (Y axis, in the drawing) as second movement data d2 by using signals mutually reverse in phase; and a third differentially-detecting section 24 which detects, in a differential manner, a relative rotation between the first end portion 12 and the second end portion 14 about a central axis along the third axis (Z axis, in the drawing) as rotation data d3 by using signals mutually reverse in phase.

The first differentially-detecting section 20 includes a plurality of (two, in the drawing) first surfaces 26 provided in the first end portion 12 and a plurality of (two, in the drawing) second surfaces 28 provided in the second end portion 14 and opposed respectively to the first surfaces 26. The first differentially-detecting section 20 detects, as the first movement data d1, changes occurring oppositely in phase in a plurality of (two, in the drawing) first gaps 30 between the first surfaces 26 and the second surfaces 28.

The second differentially-detecting section 22 includes a plurality of (two, in the drawing) third surfaces 32 provided in the first end portion 12 and a plurality of (two, in the drawing) fourth surfaces 34 provided in the second end portion 14 and opposed respectively to the third surfaces 32. The second differentially-detecting section 22 detects, as the second movement data d2, changes occurring oppositely in phase in a plurality of (two, in the drawing) second gaps 36 between the third surfaces 32 and the fourth surfaces 34.

The third differentially-detecting section 24 includes a first surface 26 and a third surface 32, provided in the first end portion 12, a second surface 28 opposed to the first surface 26 and a fourth surface 34 opposed to the third surface 32, the second and fourth surfaces 28, 34 provided in the second end portion 14. The third differentially-detecting section 24 detects, as the rotation data d3, changes occurring oppositely in phase in a first gap 30 between the first surface 26 and the second surface 28 and a second gap 36 between the third surface 32 and the fourth surface 34.

The detecting part 18 outputs the detection value D based on the first movement data d1 detected by the first differentially-detecting section 20, the second movement data d2 detected by the second differentially-detecting section 22, and the rotation data d3 detected by the third differentially-detecting section 24.

The concrete configuration of the force-detection structure 10 will be described in detail below, with reference to FIGS. 1 to 4E. In the following description, a rectangular three-axis coordinate system (X-Y-Z) is defined for the force-detection structure 10, and phrases such as "upper", "lower", etc., which indicate directionality in the drawings, are used for better understanding. These phrases, however, do not limit any directionality at the time of using the force-detection structure 10.

The first end portion 12 is shaped like a flat plate having a substantially square profile in plan view. The first end portion 12 includes a planar upper surface 12a extending along a virtual plane (X-Y plane) defined by the first axis (X axis) and the second axis (Y axis). An elastic column 38 extending in a direction along the third axis (Z axis) is provided at each of four corners of the upper surface 12a so as to upwardly project from the upper surface 12a. The connecting portion 16 is composed of four elastic columns 38.

The second end portion 14 is shaped like a flat plate having a substantially square profile in plan view, which corresponds to the shape of the first end portion 12. The second end portion 14 includes a planar lower surface 14a opposed to the upper surface 12a of the first end portion 12. Each of four elastic columns 38 of the connecting portion 16 is fixed, at the top end thereof, to the second end portion 14 at each of four corners of the lower surface 14a. The first end portion 12 and the second end portion 14 have rigidity capable of maintaining their own shapes against a force applied to the first end portion 12 or the second end portion 14.

In this embodiment, the rectangular coordinate system is defined in such a manner that, in an equilibrium state (FIG. 3) free from elastic deformation of the connecting portion 16, the first axis (X axis) and the second axis (Y axis) are disposed parallel to the four sides of the substantially square upper and lower surfaces 12a and 14a, and the third axis (Z axis) is disposed parallel to an axis passing through the centers of the upper and lower surfaces 12a and 14a. Note that the shapes of the first end portion 12 and the second end portion 14 are not limited to the illustrated rectangular flat plate, and may be, for example, a circular disc or other polygon.

Each of four elastic columns 38 is constructed so as not to be easily deformed (i.e., elongated or contracted) by a force in a direction parallel to the third axis (Z axis), but to be elastically bent, as if a column inclines, by a force in a direction parallel to the first axis (X axis), a force in a direction parallel to the second axis (Y axis), or a force in a rotational direction about the third axis (Z axis). When a force is applied to the first end portion 12 or the second end portion 14, four elastic columns 38 exclusively exhibit the above elastic deformation, because of the rigidity of the first end portion 12 and the second end portion 14. When the elastic columns 38 elastically deform by receiving the aforementioned force, the first end portion 12 and the second end portion 14 cause a relative movement in a direction along a virtual plane (X-Y plane) involving the first axis (X axis) and the second axis (Y axis), or a relative rotation about a central axis along the third axis (Z axis).

Each elastic column 38 may have a rectangular columnar shape as illustrated, or have various other shapes such as a circular column or other polygonal columns. More specifically, each elastic column 38 may have an entirely uniform thickness as illustrated, or have a thinner or thicker center length or a thinner or thicker end length, or have combined curved outer surfaces. Four elastic columns 38 may have an equal length as illustrated, or have mutually different lengths. In the case where four elastic columns 38 have an equal length, the upper surface 12a of the first end portion 12 and the lower surface 14a of the second end portion 14 are disposed in parallel.

The positions of the elastic columns 38 are not limited to the four corners of the upper surface 12a of the first end portion 12, and may be arranged, for example, at any points along the four sides of the upper surface 12a. The number of the elastic columns 38 is not limited to four, and may be three, or five or more. The connecting portion 16 just needs to enable the displacement between the first end portion 12 and the second end portion 14 in the aforementioned three degrees of freedom, and based on this premise, a desired number of elastic columns 38 may be provided at desired positions.

The first end portion 12 is provided with four first blocks 40 and 42, each protruding from the upper surface 12a in a direction along the third axis (Z axis) (FIGS. 1 to 3). Each first block 40, 42 is shaped like a rectangular parallelepiped, and is disposed at a predetermined position on the upper surface 12a. Each of two first blocks 40 includes a first surface 26 extending along a virtual plane (X-Z plane) defined by the first axis (X axis) and the third axis (Z axis) (FIG. 3). Each of remaining two first blocks 42 includes a third surface 32 extending along a virtual plane (Y-Z plane) defined by the second axis (Y axis) and the third axis (Z axis) (FIG. 3).

The second end portion 14 is provided with four second blocks 44 and 46, each protruding from the lower surface 14a in a direction along the third axis (Z axis) (FIGS. 1 to 3). Each second block 44, 46 is shaped like a rectangular parallelepiped, and is disposed at a predetermined position on the lower surface 14a, which corresponds to the position of each first block 40, 42. Each of two second blocks 44 includes a second surface 28 extending along a virtual plane (X-Z plane) defined by the first axis (X axis) and the third axis (Z axis) (FIG. 3). Each of remaining two second blocks 46 includes a fourth surface 34 extending along a virtual plane (Y-Z plane) defined by the second axis (Y axis) and the third axis (Z axis) (FIG. 3).

The first surface 26 and the second surface 28, which extend along the same virtual plane (X-Z plane) at a mutually corresponding position, are disposed to be opposed substantially in parallel to each other in an equilibrium state where the connecting portion 16 is not elastically deformed. In each of two pairs of the mutually opposed first surface 26 and second surface 28, the first gap 30 is formed between the surfaces 26 and 28 (FIG. 3). In the equilibrium state where the connecting portion 16 does not elastically deform, two first gaps 30 can have mutually identical shape and dimension.

The third surface 32 and the fourth surface 34, which extend along the same virtual plane (Y-Z plane) at a mutually corresponding position, are disposed to be opposed substantially in parallel to each other in an equilibrium state where the connecting portion 16 is not elastically deformed. In each of two pairs of the mutually opposed third surface 32 and fourth surface 34, the second gap 36 is formed between the surfaces 32 and 34 (FIG. 3). In the equilibrium state where the connecting portion 16 does not elastically deform, two second gaps 36 can have mutually identical shape and dimension.

Thus, two first blocks 40 formed in the first end portion 12 and two second blocks 44 formed in the second end portion 14 include respectively the first surfaces 26 and the second surfaces 28, which are the constituent elements of the first differentially-detecting section 20. In this connection, one pair of juxtaposed first and second blocks 40 and 44 and the other pair of juxtaposed first and second blocks 40 and 44 are provided, in the first end portion 12 and the second end portion 14, in such a manner that the juxtaposed relationship between "first" and "second" is inverted in the direction of the first axis (X axis) (FIG. 3).

Also, two first blocks 42 formed in the first end portion 12 and two second blocks 46 formed in the second end portion 14 include respectively the third surfaces 32 and the fourth surfaces 34, which are the constituent elements of the second differentially-detecting section 22. In this connection, one pair of juxtaposed first and second blocks 42 and 46 and the other pair of juxtaposed first and second blocks 42 and 46 are provided, in the first end portion 12 and the second end portion 14, in such a manner that the juxtaposed relationship between "first" and "second" is inverted in the direction of the second axis (Y axis) (FIG. 3).

Also, two first blocks 40 and two first blocks 42, formed in the first end portion 12, and two second blocks 44 and two second blocks 46, formed in the second end portion 14, include respectively the first and third surfaces 26 and 32 and the second and fourth surfaces 28 and 34, which are the constituent elements of the third differentially-detecting section 24. In this connection, two pairs of juxtaposed first and second blocks 40 and 44 and two pairs of juxtaposed first and second blocks 42 and 46 are provided, in the first end portion 12 and the second end portion 14, in such a manner that the juxtaposed relationship between "first" and "second" is inverted in the rotational direction about the third axis (Z axis) (FIG. 3).

Figure 4A:
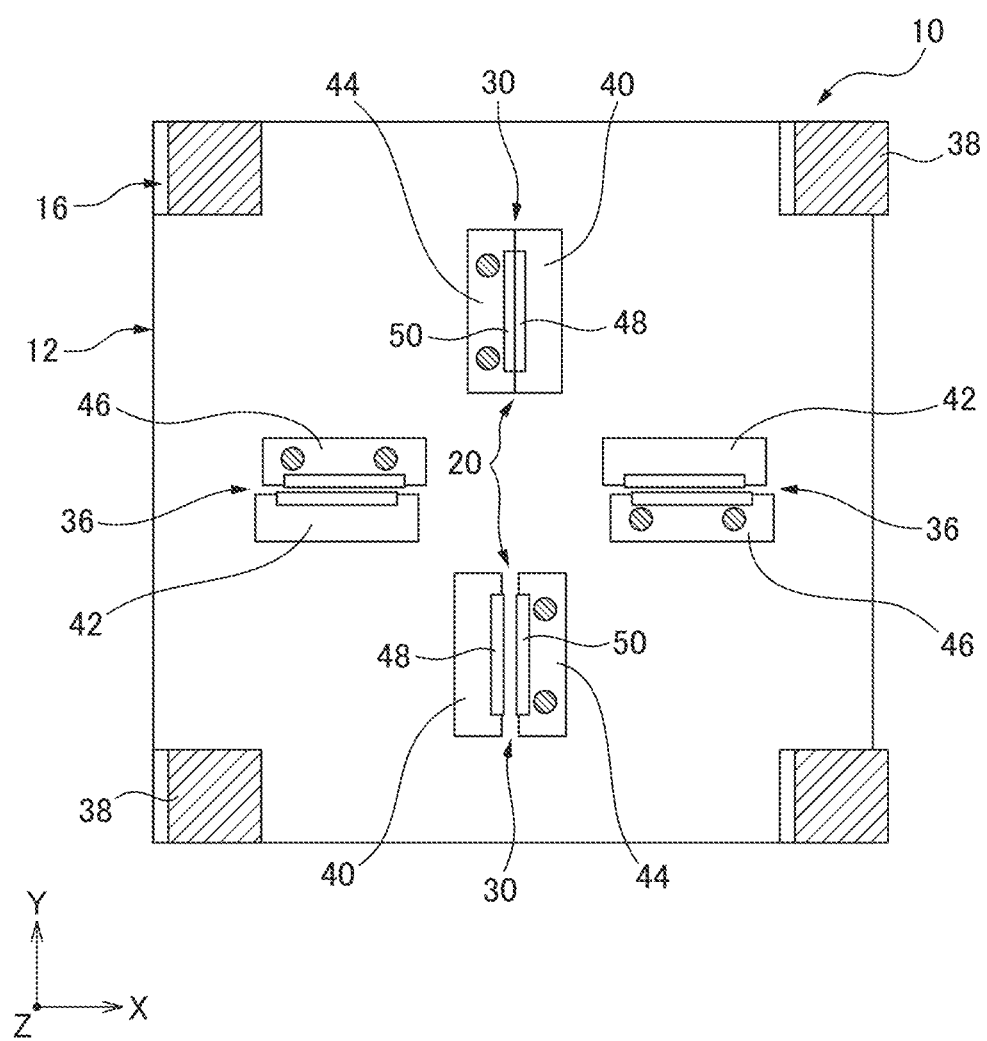
FIG. 4A is a sectional view corresponding to FIG. 3, and illustrating an example of a displacement motion of the force-detection structure of FIG. 1.
Figure 4C:
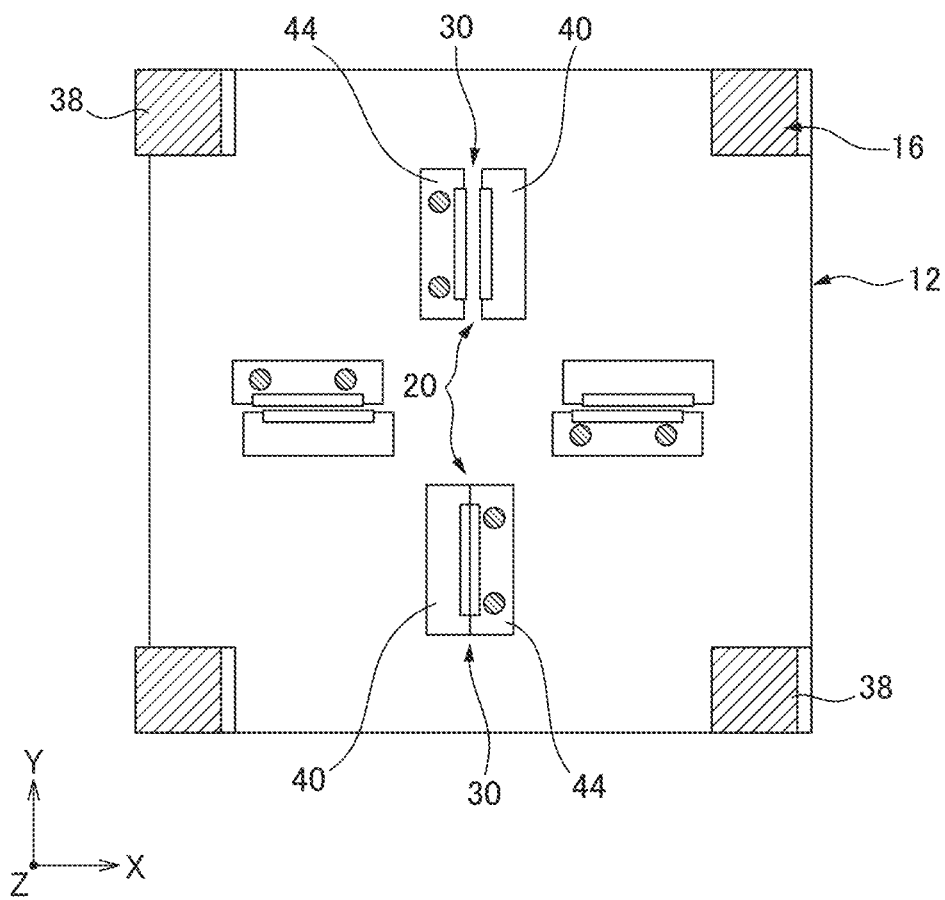
FIG. 4C is a sectional view corresponding to FIG. 3, and illustrating another example of a displacement motion of the force-detection structure of FIG. 1.
Figure 4D:
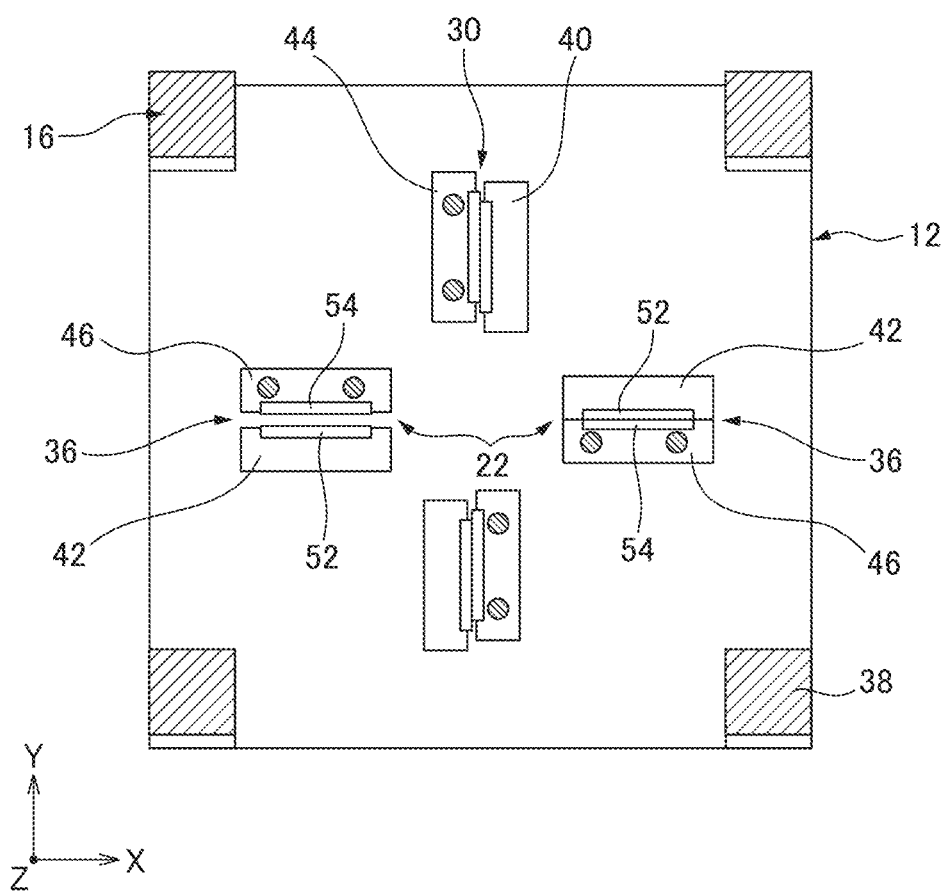
FIG. 4D is a sectional view corresponding to FIG. 3, and illustrates a further example of a displacement motion of the force-detection structure of FIG. 1.
Figure 4E:
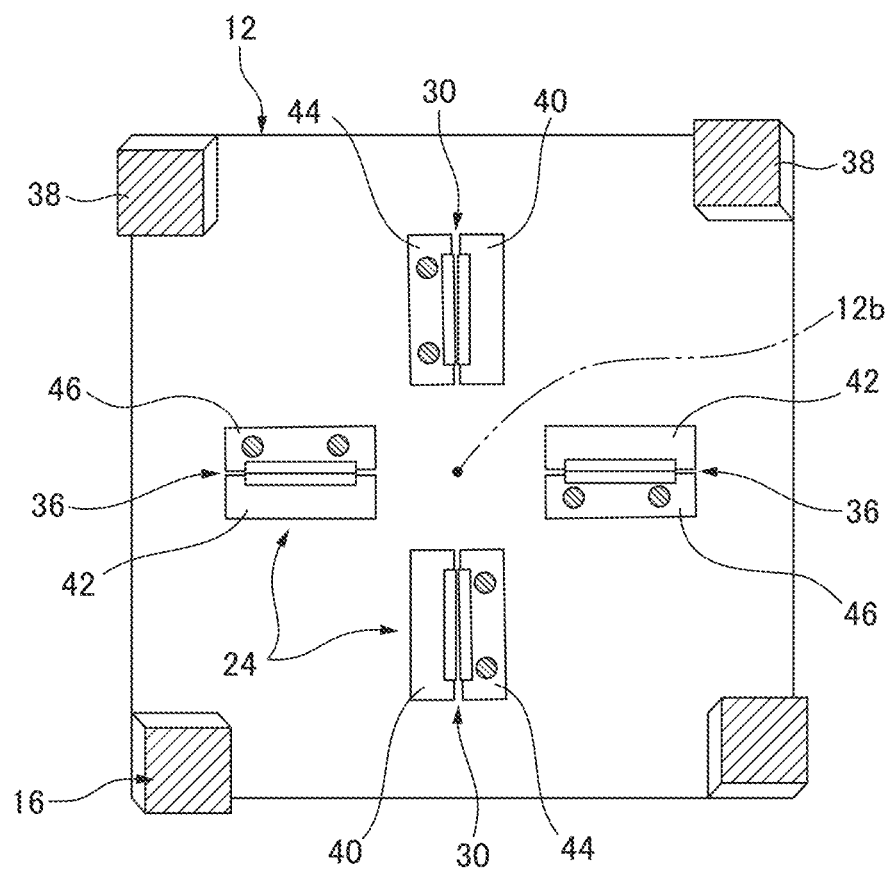
FIG. 4E is a sectional view corresponding to FIG. 3, and illustrates a still further example of a displacement motion of the force-detection structure of FIG. 1.

Starting from the equilibrium state illustrated in FIGS. 1 to 3, when the first end portion 12 and the second end portion 14 relatively move in the direction along the first axis (X axis), the first and second blocks 40 and 44 mutually juxtaposed in the direction of X axis move accordingly relative to each other, and the dimensions of two first gaps 30 change in accordance with the distance of the relative movement (FIGS. 4A to 4C). Similarly, when the first end portion 12 and the second end portion 14 relatively move in the direction along the second axis (Y axis), the first and second blocks 42 and 46 mutually juxtaposed in the direction of Y axis move accordingly relative to each other, and the dimensions of two second gaps 36 change in accordance with the distance of the relative movement (FIG. 4D). On the other hand, when the first end portion 12 and the second end portion 14 relatively rotate about a central axis along the third axis (Z axis) (in the illustrated example, a central axis 12b of the first end portion 12 having a rectangular profile in plan view), the first and second blocks 40 and 44 rotate accordingly relative to each other and the first and second blocks 42 and 46 rotate accordingly relative to each other, and the dimensions of two first gaps 30 and the dimensions of two second gaps 36 change in accordance with the angle of the relative rotation (FIG. 4E). During the relative movement or rotation, the first end portion 12 and the second end portion 14 do not deform, and only the connecting portion 16 (or elastic columns 38) elastically deforms.

For example, as illustrated in FIGS. 4A and 4B, when the second end portion 14 moves relative to the first end portion 12 in the positive direction of X axis (rightward, in the drawing), the dimension of one (lower, in FIG. 4A) first gap 30 increases and the dimension of the other (upper, in FIG. 4A) first gap 30 decreases correspondingly to the increase of the lower first gap 30, since the juxtaposed relationship of one pair of first and second blocks 40 and 44 is inverted relative to the juxtaposed relationship of the other pair of first and second blocks 40 and 44 in the direction of X axis. Similarly, as illustrated in FIG. 4C, when the second end portion 14 moves relative to the first end portion 12 in the negative direction of X axis (leftward, in the drawing), the dimension of one (lower, in FIG. 4A) first gap 30 decreases and the dimension of the other (upper, in FIG. 4A) first gap 30 increases correspondingly to the decrease of the lower first gap 30. The first differentially-detecting section 20 detects, as the first movement data d1, the above changes in dimensions occurring oppositely in phase in two first gaps 30, by converting the changes to signals mutually reverse in phase and executing arithmetic processing for the signals in a differential manner.

Note that when the first end portion 12 and the second end portion 14 relatively move in the direction of X axis, the first block 42 and the second block 46 simultaneously relatively move in the direction of X axis. However, a displacement ratio along an in-plane direction between the third surface 32 and the fourth surface 34 (in other words, a change ratio of the second gap 36) during the relative movement is sufficiently small, compared to a change ratio of the first gap 30, and thus it is possible to execute the arithmetic processing so as to exclude the change in the second gap 36 from the first movement data d1.

Also, for example, as illustrated in FIG. 4D, when the second end portion 14 moves relative to the first end portion 12 in the positive direction of Y axis (upward, in the drawing), the dimension of one (left, in FIG. 4D) second gap 36 increases and the dimension of the other (right, in FIG. 4D) second gap 36 decreases correspondingly to the increase of the left second gap 36, since the juxtaposed relationship of one pair of first and second blocks 42 and 46 is inverted relative to the juxtaposed relationship of the other pair of first and second blocks 42 and 46 in the direction of Y axis. Similarly, although not illustrated, when the second end portion 14 moves relative to the first end portion 12 in the negative direction of Y axis (downward, in the drawing), the dimension of one (left, in FIG. 4D) second gap 36 decreases and the dimension of the other (right, in FIG. 4D) second gap 36 increases correspondingly to the decrease of the left second gap 36. The second differentially-detecting section 22 detects, as the second movement data d2, the above changes in dimensions occurring oppositely in phase in two second gaps 36, by converting the changes to signals mutually reverse in phase and executing arithmetic processing for the signals in a differential manner.

Note that when the first end portion 12 and the second end portion 14 relatively move in the direction of Y axis, the first block 40 and the second block 44 simultaneously relatively move in the direction of Y axis. However, a displacement ratio along an in-plane direction between the first surface 26 and the second surface 28 (in other words, a change ratio of the first gap 30) during the relative movement is sufficiently small, compared to a change ratio of the second gap 36, and thus it is possible to execute the arithmetic processing so as to exclude the change in the first gap 30 from the second movement data d2.

Besides, for example, as illustrated in FIG. 4E, when the second end portion 14 rotates relative to the first end portion 12 right-hand with respect to the positive direction of Z axis (counterclockwise, in the drawing), the dimensions of two first gaps 30 increase and the dimensions of two second gaps 36 decrease correspondingly to the increase of two first gaps 30, since the juxtaposed relationship of two pairs of first and second blocks 40 and 44 is inverted relative to the juxtaposed relationship of two pairs of first and second blocks 42 and 46 in the rotational direction about Z axis. Similarly, although not illustrated, when the second end portion 14 rotates relative to the first end portion 12 left-hand with respect to the positive direction of Z axis (clockwise, in drawing), the dimensions of two first gaps 30 decrease and the dimensions of two second gaps 36 increase correspondingly to the decrease of two first gaps 30. The third differentially-detecting section 24 detects, as the rotation data d3, the above changes in dimensions occurring oppositely in phase in the first and second gaps 30 and 36, by converting the changes to signals mutually reverse in phase and executing arithmetic processing for the signals in a differential manner.

Each of the first gap 30 and the second gap 36 may have an electrostatic capacitance (hereinafter referred to as a capacitance), as one example of a constituent element for representing the change in dimension of the gap by a numerical quantity. In this configuration, in order to detect the relative displacement in connection with the aforementioned three directions, the detecting part 18 may be provide for the first and second gaps 30 and 36 with at least three capacitance-forming parts (i.e., pairs of electrodes) which are electrically independent from one another. In the force-detection structure 10, each of the total of four first and second gaps 30 and 36 includes a single capacitance-forming part. The detecting part 18 detects a change in capacitance in each of the capacitance-forming parts, and thereby outputs the detection value D.

For example, an electrode 48 is formed in the first surface 26 of the first block 40 as illustrated in FIG. 3, and an electrode 50 having a surface area identical to that of the electrode 48 is formed in the second surface 28 of the opposed second block 44. The mutually opposed electrodes 48 and 50 (i.e., an electrode pair) constitute a capacitance-forming part, and provides a predetermined capacitance in the first gap 30 electrically insulating the electrodes 48 and 50 from each other. A change in the first gap 30 can be detected by, for example, applying a predetermined voltage with a predetermined frequency to one electrode 48 of the electrode pair and measuring the value of current flowing in the other electrode 50.

Similarly, an electrode 52 is formed in the third surface 32 of the first block 42, and an electrode 54 having a surface area identical to that of the electrode 52 is formed in the fourth surface 34 of the opposed second block 46. The mutually opposed electrodes 52 and 54 (i.e., an electrode pair) constitute a capacitance-forming part, and provides a predetermined capacitance in the second gap 36 electrically insulating the electrodes 52 and 54 from each other. A change in the second gap 36 can be detected by, for example, applying a predetermined voltage with a predetermined frequency to one electrode 52 of the electrode pair and measuring the value of current flowing in the other electrode 54.

As illustrated in, for example, FIGS. 4A to 4C, when the first end portion 12 and the second end portion 14 move relative to each other in a direction along the first axis (X axis), the electrodes 48 and 50 opposed in a direction of the first axis (X axis) are translated relative to each other (or make a translation or parallel displacement) in a direction toward or away from each other, so as to uniformly decease or increase the first gap 30. At this time, since the dimensions of two first gaps 30 change oppositely in phase as described above, the capacitances of the first gaps 30 also change oppositely in phase, so that electric signals mutually reverse in phase are obtained through two electrode pairs 48, 50. The first differentially-detecting section 20 executes arithmetic processing in a differential manner for the electric signals reverse in phase, and detects the processed electric signals as the first movement data d1.

Also, as illustrated in, for example, FIG. 4D, when the first end portion 12 and the second end portion 14 move relative to each other in a direction along the second axis (Y axis), the electrodes 52 and 54 opposed in a direction of the second axis (Y axis) are translated relative to each other (or make a translation or parallel displacement) in a direction toward or away from each other, so as to uniformly decease or increase the second gap 36. At this time, since the dimensions of two second gaps 36 change oppositely in phase as described above, the capacitances of the second gaps 36 also change oppositely in phase, so that electric signals mutually reverse in phase are obtained through two electrode pairs 52, 54. The second differentially-detecting section 22 executes arithmetic processing in a differential manner for the electric signals reverse in phase, and detects the processed electric signals as the second movement data d2.

Besides, as illustrated in, for example, FIG. 4E, when the first end portion 12 and the second end portion 14 rotate relative to each other about a central axis 12b along the third axis (Z axis), the electrodes 48 and 50 opposed in a direction of the first axis (X axis) are inclined relative to each other, and the electrodes 52 and 54 opposed in a direction of the second axis (Y axis) are inclined relative to each other, so that each of the first and second gaps 30 and 36 is decreased at one end region and increased at the other end region in the electrode pair. At this time, since the dimension of the first gap 30 and the dimension of the second gap 36 change oppositely in phase as described above, the capacitance of the first gap 30 and the capacitance of the second gap 36 also change oppositely in phase, so that electric signals mutually reverse in phase are obtained through the electrode pair 48, 50 and the electrode pair 52, 54. The third differentially-detecting section 24 executes arithmetic processing in a differential manner for the electric signals reverse in phase, and detects the processed electric signals as the rotation data d3.

In the force-detection structure 10, a constituent element for representing the change in dimension of each of the first gap 30 and the second gap 36 by a numerical quantity is not limited to the capacitance. For example, the change in dimension of the first gap 30 or the second gap 36 can be detected by measuring magnetic permeance, light quantity, etc., in the first gap 30 or the second gap 36, or by measuring eddy current generating due to a winding formed as one electrode of the electrode pair 48, 50 or one electrode of the electrode pair 52, 54. Accordingly, the first differentially-detecting section 20 can detect the changes in the first gaps 30 by using one of capacitance, eddy current, magnetic permeance and light quantity. Also, the second differentially-detecting section 22 can detect the changes in the second gaps 36 by using one of capacitance, eddy current, magnetic permeance and light quantity. Besides, the third differentially-detecting section 24 can detect the change in the first gap 30 and the change in the second gap 36 by using one of capacitance, eddy current, magnetic permeance and light quantity.

Figure 5A:
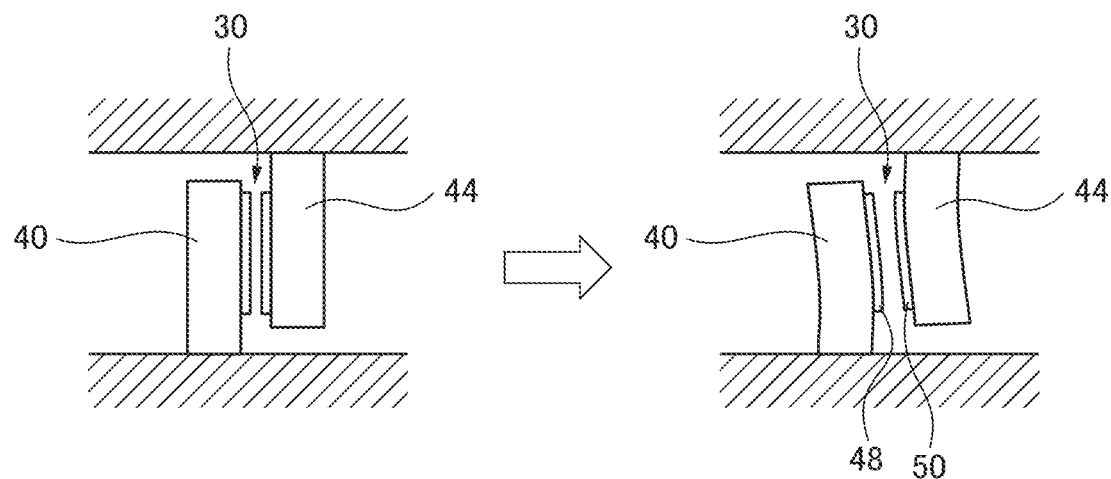
FIG. 5A is an illustration for explaining an example of a state of a detecting part at a time of occurrence of a drift.
Figure 5B:
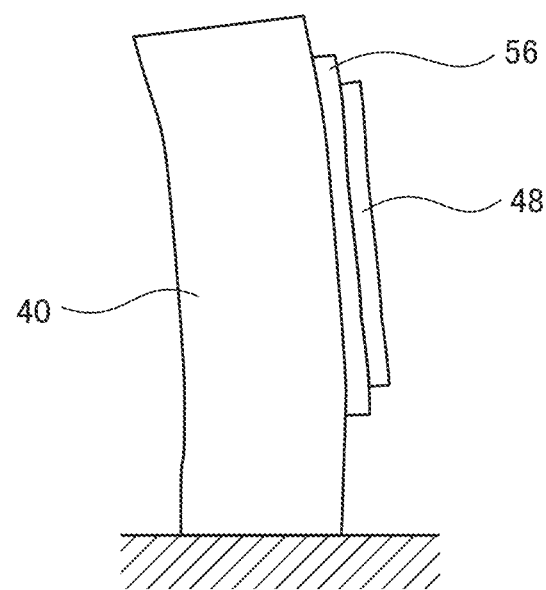
FIG. 5B is a partially enlarged view of FIG. 5A.

In the force-detection structure 10, in a case where a constituent element (in particular, a constituent element of the detecting part 18) undergoes a deformation or a characteristic change due to environmental factors other than a force, such as a temperature or humidity, it is concerned that the first movement data d1, the second movement data d2 and the rotation data d3 vary and a drift occurs in the detection value D. For example, as illustrated in FIG. 5A, the mutually juxtaposed first and second blocks 40 and 44 may be deformed in the same mode (i.e., in a mirror-image manner) due to a temperature change in environment. As illustrated in FIG. 5B in enlarged scale, the electrode 48 is formed on the first block 40 with an insulation layer 56 interposed therebetween, and since the materials of these three members are different from each other, the illustrated deformation resulting from a difference in coefficients of thermal expansion may occur due to the temperature change. The illustrated deformation occurs in the same mode in the second block 44, and thereby the dimension of the first gap 30 may possibly change, despite the fact that no force is applied to the force-detection structure 10 (FIG. 5A). The second gap 36 also involves analogous problems.

Figure 6:
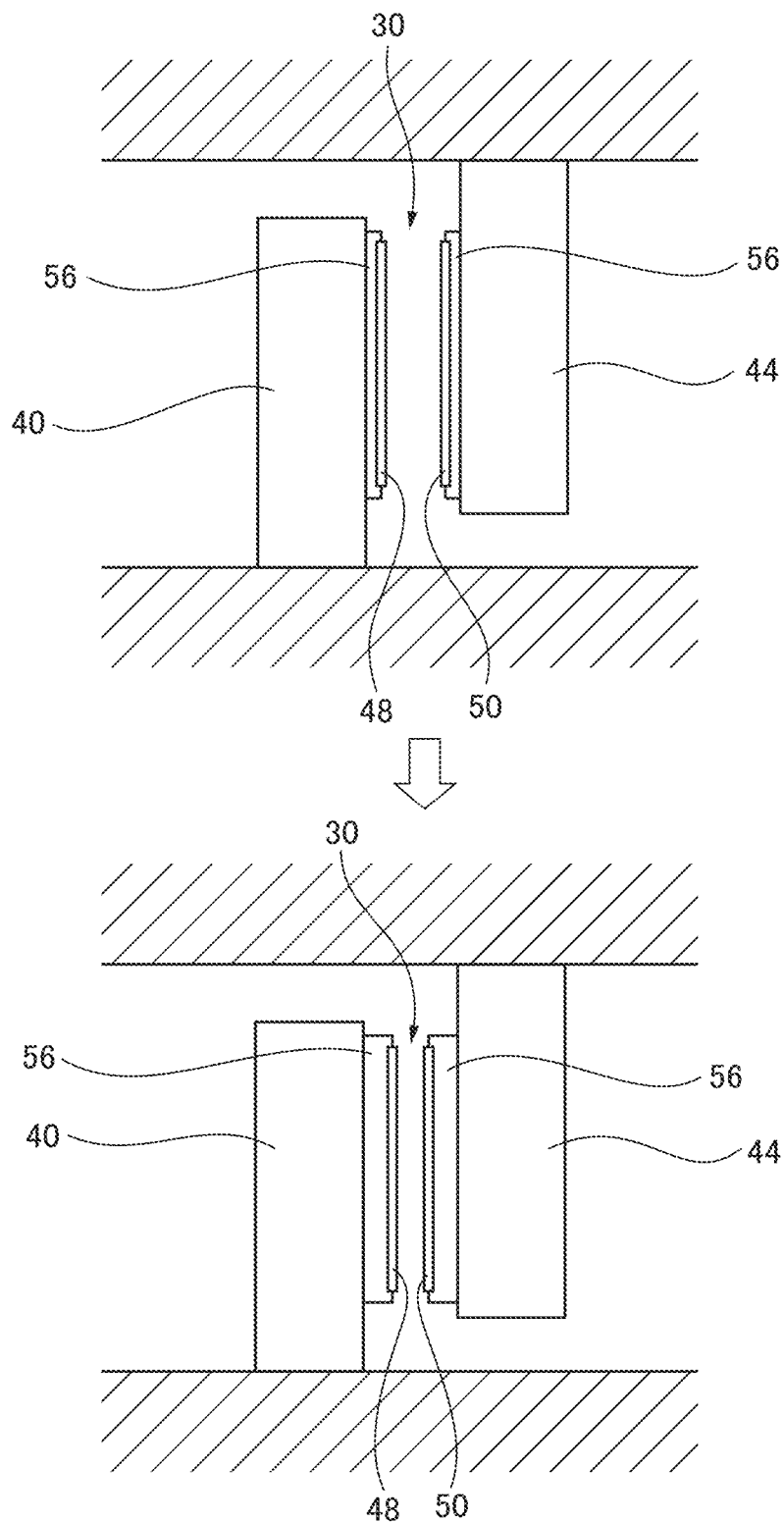
FIG. 6 is an illustration for explaining another example of a state of a detecting part at a time of occurrence of a drift.

Also, as illustrated in FIG. 6, there is a case where the insulation layers 56 of the mutually juxtaposed first and second blocks 40 and 44 may undergo a deformation (or a hygroscopic expansion) in the same mode due to a humidity change in environment. In this case, the dimension of the first gap 30 may also possibly change, despite the fact that no force is applied to the force-detection structure 10. Note that if the thickness of the insulation layer 56 varies, a dielectric constant of the insulation layer 56 or a floating capacitance between the insulation layer 56 and the first block 40 may change, and such a characteristic change of the insulation layer 56 may possibly affect the detection value D. The second gap 36 also involves analogous problems.

Figure 7A:
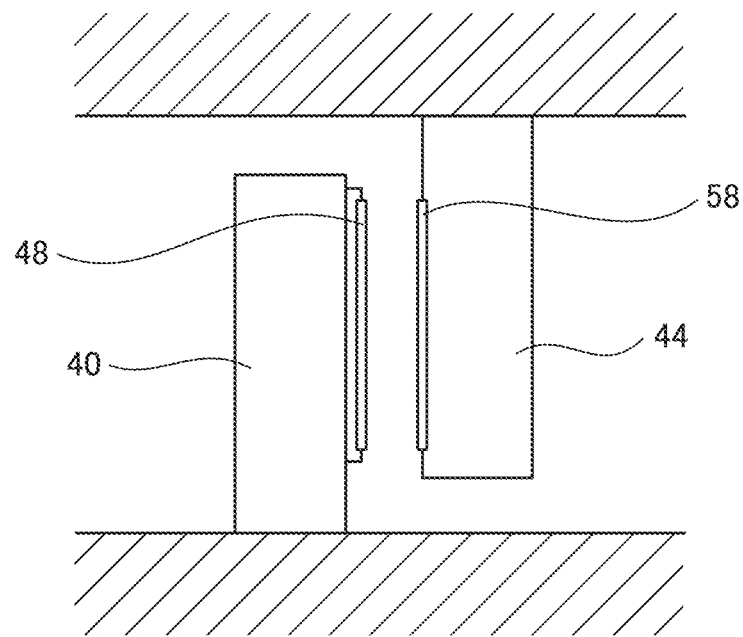
FIG. 7A illustrates a modification of a detecting part.
Figure 7B:
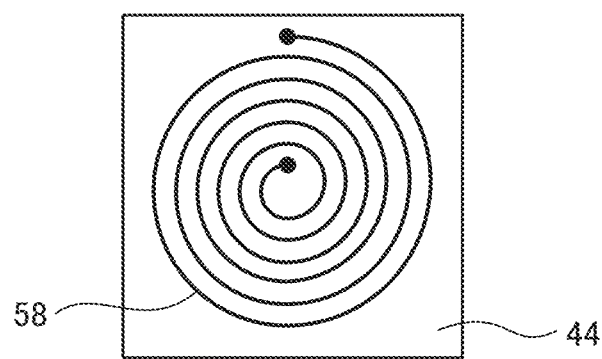
FIG. 7B illustrates a modification of a detecting part.
Figure 8:
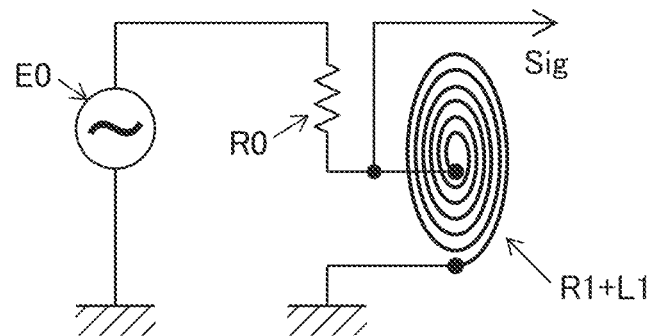
FIG. 8 is an illustration for explaining a further example of a state of a detecting part at a time of occurrence of a drift.

As illustrated in, for example, FIGS. 7A and 7B, in a configuration wherein the mutually juxtaposed first and second blocks 40 and 44 include the second block 44 provided with a winding 58 (e.g., formed by etching a metal-plate electrode in a swirl shape) in place of the electrode 50, the change of the first gap 30 can be detected by applying a predetermined voltage with a predetermined frequency to the winding 58 and measuring a current change in the winding 58 occurring due to eddy current generating in the electrode 48 of the first block 40. In this configuration, as will be understood from an equivalent circuit illustrated in FIG. 8, a signal (Sig) can be obtained by the following equation:

$$Sig = |E0 \times (R1 + L1j)/(R0 + R1 + L1j)|$$

Accordingly, if the resistance value of the electrode 48 or the winding 58 varies due to a temperature change in environment, the signal varies as if the inductance of the first gap 30 varies (i.e., the gap dimension changes). The second gap 36 also involves analogous problems.

On the above various circumstances, the force-detection structure 10 has the aforementioned configuration wherein the first differentially-detecting section 20, the second differentially-detecting section 22 and the third differentially-detecting section 24, of the detecting part 18, detect, in the differential manner, the first movement data d1, the second movement data d2 and the rotation data d3, so that a variation in signals, which results from changes in dimension, etc., of the first gap 30 and the second gap 36 caused by environmental factors other than a force, is canceled by a difference between the signals reverse in phase. Consequently, in the force-detection structure 10, even when a constituent element (in particular, a constituent element of the detecting part 18) undergoes a deformation or a characteristic change due to environmental factors other than a force, such as a temperature or humidity, it is possible to detect the first movement data d1, the second movement data d2 and the rotation data d3, which exactly represent a displacement due to the force, and thereby improve the accuracy and precision of the detection value D.

Figure 9:
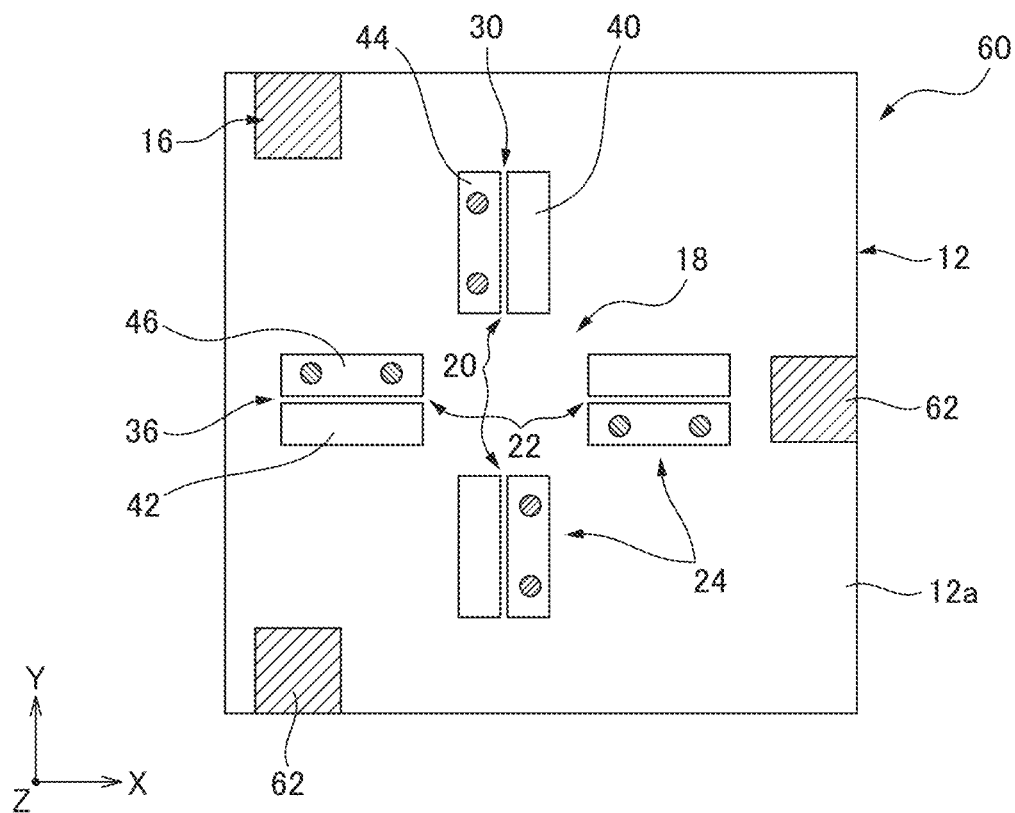
FIG. 9 is a sectional view corresponding to FIG. 3, and illustrating a force-detection structure according to a second embodiment.

FIG. 9 illustrates an entire configuration of a force-detection structure 60 according to a second embodiment.

The force-detection structure 60 has a configuration analogous to that of the aforementioned force-detection structure 10, except for the configuration of the connecting portion 16. Thus, corresponding constituent elements are denoted by common reference numerals in order to avoid a repeated description thereof.

The force-detection structure 60 includes a first end portion 12; a second end portion 14 (FIG. 1); a connecting portion 16 which elastically connects the first end portion 12 to the second end portion 14 with three degrees of freedom; and a detecting part 18 which detects a relative displacement between the first end portion 12 and the second end portion 14, the relative displacement accompanied by the elastic deformation of the connecting portion 16. The connecting portion 16 is composed of three elastic columns 62 extending in a direction along the third axis (Z axis), which are provided at predetermined locations along three sides of the upper surface 12a of the first end portion 12 so as to upwardly project from the upper surface 12a.

In the force-detection structure 60, when a force is applied to the first end portion 12 or the second end portion 14, a first differentially-detecting section 20, a second differentially-detecting section 22 and a third differentially-detecting section 24 execute a displacement detecting operation analogous to the displacement detecting operation in the force-detection structure 10. Thus, the detecting part 18 outputs a detection value D, based on first movement data d1, second movement data d2 and rotation data d3, which are detected, in a differential manner, by the first differentially-detecting section 20, the second differentially-detecting section 22 and the third differentially-detecting section 24, respectively. Accordingly, the force-detection structure 60 can achieve advantageous effects equivalent to those in the force-detection structure 10.

Figure 10:
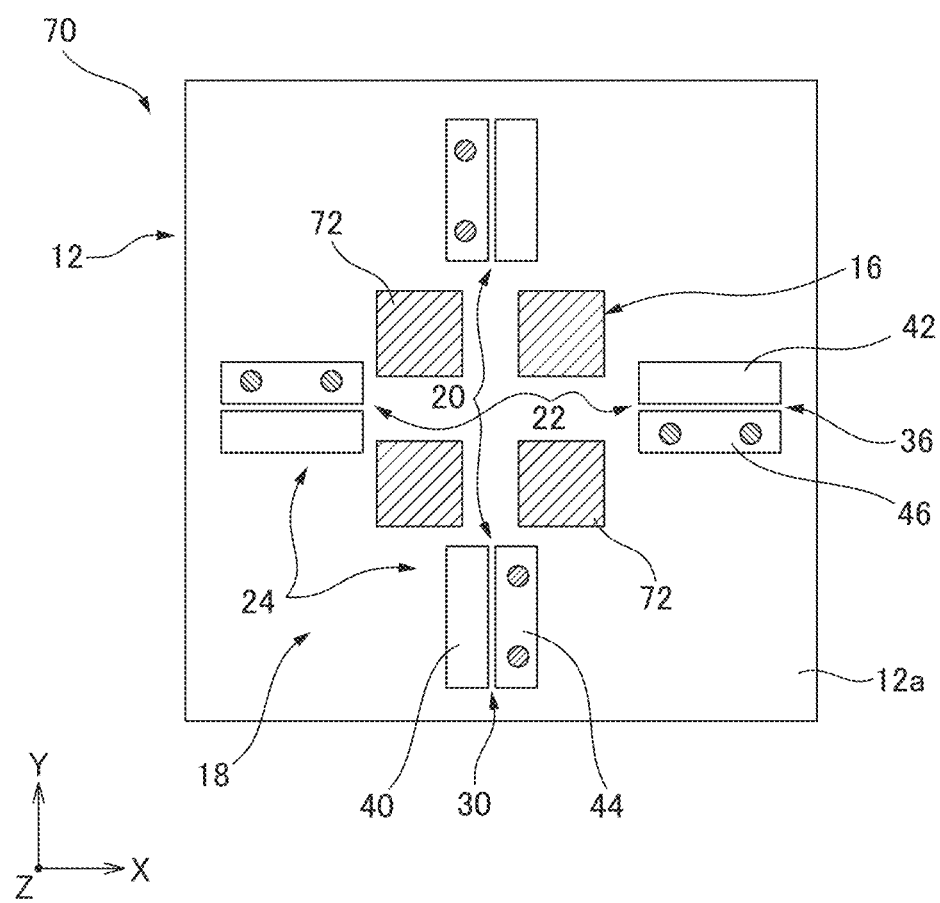
FIG. 10 is a sectional view corresponding to FIG. 3, and illustrating a force-detection structure according to a third embodiment.

FIG. 10 illustrates an entire configuration of a force-detection structure 70 according to a third embodiment. The force-detection structure 70 has a configuration analogous to that of the aforementioned force-detection structure 10, except for the configuration of the connecting portion 16. Thus, corresponding constituent elements are denoted by common reference numerals in order to avoid a repeated description thereof.

The force-detection structure 70 includes a first end portion 12; a second end portion 14 (FIG. 1); a connecting portion 16 which elastically connects the first end portion 12 to the second end portion 14 with three degrees of freedom; and a detecting part 18 which detects a relative displacement between the first end portion 12 and the second end portion 14, the relative displacement accompanied by the elastic deformation of the connecting portion 16. The connecting portion 16 is composed of four elastic columns 72 extending in a direction along the third axis (Z axis), which are provided at four locations near the center of the upper surface 12a of the first end portion 12 so as to upwardly project from the upper surface 12a.

In the force-detection structure 70, when a force is applied to the first end portion 12 or the second end portion 14, a first differentially-detecting section 20, a second differentially-detecting section 22 and a third differentially-detecting section 24 execute a displacement detecting operation analogous to the displacement detecting operation in the force-detection structure 10. Thus, the detecting part 18 outputs a detection value D, based on first movement data d1, second movement data d2 and rotation data d3, which are detected, in a differential manner, by the first differentially-detecting section 20, the second differentially-detecting section 22 and the third differentially-detecting section 24, respectively. Accordingly, the force-detection structure 70 can achieve advantageous effects equivalent to those in the force-detection structure 10.

The force-detection structure 10, 60 or 70 is configured to enable a detection of the aforementioned first force component, second force component and moment component, of a force applied to the first end portion 12 or the second end portion 14, based on the detection value D obtained by the detecting part 18. The detection of the force and moment components can be implemented by a calculating device provided separately from the force-detection structure 10, 60, 70. Alternatively, as illustrated in FIG. 1, the force-detection structure 10, 60, 70 may be provided in itself with a calculating part 80 which calculates the first force component, the second force component and the moment component, of a force applied to the first end portion 12 or the second end portion 14, by using the detection value D detected by the detecting part 18.

The calculation for calculating the force and moment components from the detection value D can be executed, for example, by a method of performing a matrix calculation between the detection value D and a transform coefficient matrix obtained in advance. The transform coefficient matrix can be obtained by applying a known load to the force-detection structure 10, 60, 70 in various directions, collecting displacement data corresponding to the force and moment components of the applied load along the three axes, and executing a known mathematical method relative to the collected displacement data. In the configuration wherein a capacitance is used for a displacement detection, the capacitance is inversely proportional to the dimension of each of the first gap 30 and the second gap 36, so that the detecting part 18 can obtain a displacement amount from an inverse number of detected change in the capacitance and output the detection value D based on the obtained displacement amount. Alternatively, by using a known mathematical method, the calculating part 80, for instance, may directly obtain the force and moment components, based on the raw data of the change in capacitance detected by the detecting part 18 (i.e., the detected value of the capacitance). In this case, the detecting part 18 outputs the detected changes in the respective capacitances as the detection value D. The calculating part 80 can calculate the force and moment components by multiplying the detection value D by a value of rigidity (known value) of the connecting portion 16.

The force-detection structure 10, 60, 70 may be combined with an additional detection structure capable of detecting the other component(s) relating to one or more axes, of a force applied to the first end portion 12 or the second end portion 14, which is different from the aforementioned three-axis components, so as to constitute an at-least-four-axis force sensor. A configuration of a six-axis force sensor 90, as one embodiment of the at-least-four-axis force sensor, will be described below with reference to FIGS. 11 to 13C. Note that, in FIGS. 11 to 13C, the configuration of a second end portion 14 is simplified for illustration purposes.

The six-axis force sensor 90 includes a force-detection structure 10 and an additional detection structure 92 including a second end portion 14 shared with the force-detection structure 10. The additional detection structure 92 includes the second end portion 14; a third end portion 94 opposite to the second end portion 14; a second connecting portion 96 which elastically connects the second end portion 14 to the third end portion 94 with second three-degrees of freedom different from the three degrees of freedom of the connecting portion 16 of the force-detection structure 10; and a second detecting part 98 which detects a relative displacement between the second end portion 14 and the third end portion 94, the relative displacement accompanied by the elastic deformation of the second connecting portion 96.

For example, in a configuration wherein a three-axis rectangular coordinate system (X-Y-Z) is defined in space as illustrated in the drawing, the second end portion 14 and the third end portion 94 are configured in such a manner as to be able to relatively rotate about a central axis along a first axis (or X axis), relatively rotate about a central axis along a second axis (or Y axis), and relatively move in a direction along a third axis (or Z axis), while accompanied by the elastic deformation of the second connecting portion 96. In this configuration, the second three degrees of freedom are defined by a rotation about each of the central axes along the first axis (X axis) and the second axis (Y axis) and a movement in the direction along the third axis (Z axis). The second end portion 14 and the third end portion 94 can be displaced relative to each other in any one direction or in a combination of two or more directions, from among the above three directions, depending on the force applied to the third end portion 94 or the first end portion 12 of the force-detection structure 10.

The second detecting part 98 detects a relative displacement (or an amount of displacement due to a relative motion) between the second end portion 14 and the third end portion 94 in connection with the aforementioned three directions. The second detecting part 98 outputs, based on the detected relative displacement in three directions, a second detection value D2 used for acquiring a first moment component about a first axis (X axis, in the drawing), a second moment component about a second axis (Y axis, in the drawing) orthogonal to the first axis, and a third force component in the direction of a third axis (Z axis, in the drawing) orthogonal to both of the first axis and the second axis, of the force applied to the third end portion 94 or the first end portion 12.

Figure 12A:
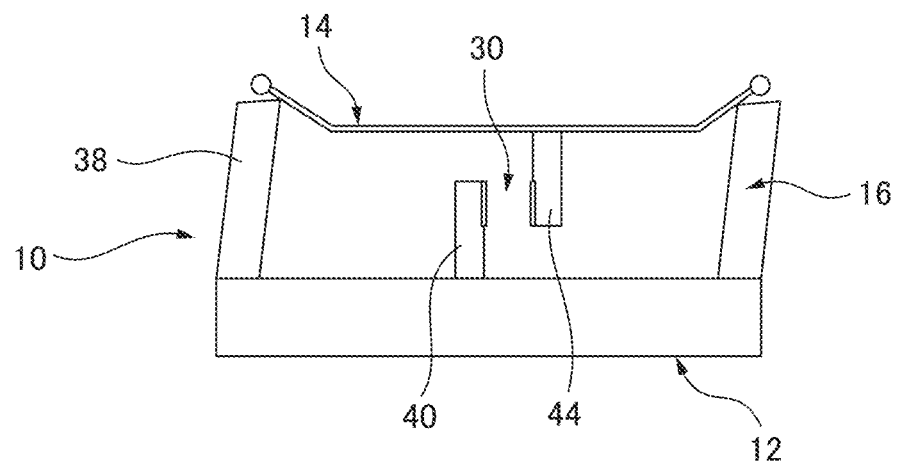
FIG. 12A illustrates a motion of the force-detection structure of the six-axis force sensor of FIG. 11.
Figure 12B:
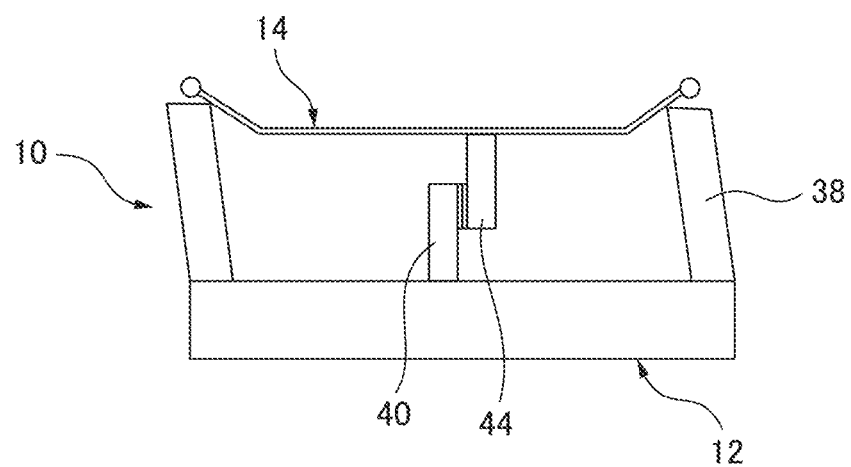
FIG. 12B illustrates a motion of the force-detection structure of the six-axis force sensor of FIG. 11.
Figure 12C:
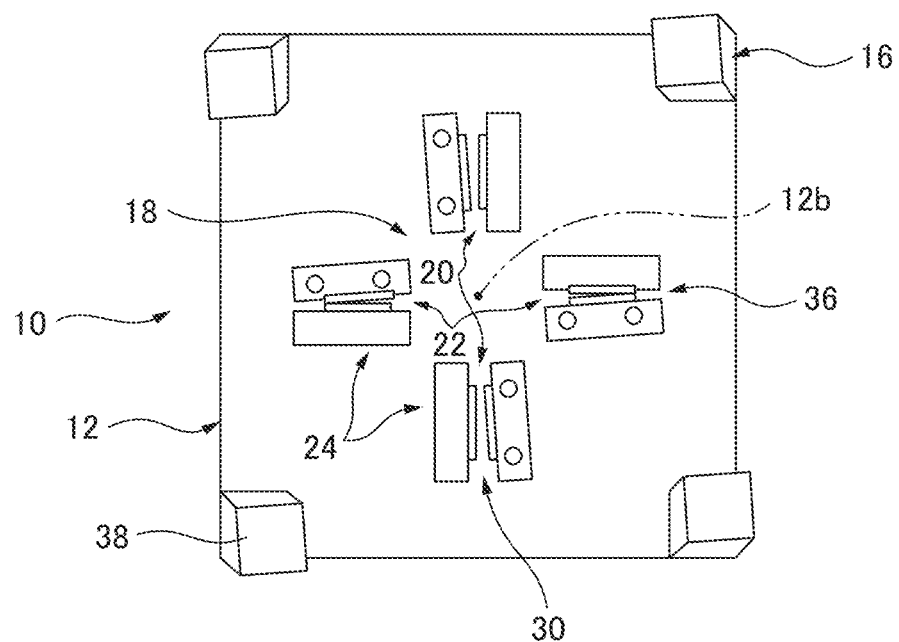
FIG. 12C illustrates a motion of the force-detection structure of the six-axis force sensor of FIG. 11.

FIGS. 12A to 12C schematically illustrate an example of the configuration and operation of the detecting part 18 of the force-detection structure 10. As previously described with reference to FIGS. 4A to 4E, the first differentially-detecting section 20, the second differentially-detecting section 22 and the third differentially-detecting section 24, of the detecting part 18, detects, in a differential manner, the first movement data d1, the second movement data d2 and the rotation data d3.

Figure 13A:
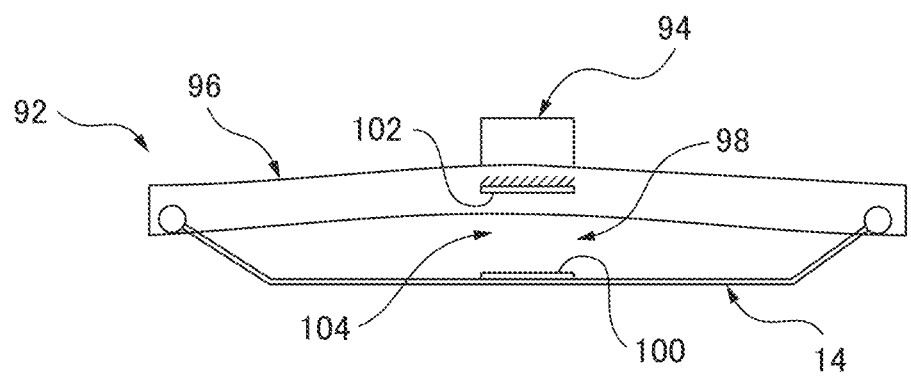
FIG. 13A illustrates a motion of an additional detection structure of the six-axis force sensor of FIG. 11.
Figure 13B:
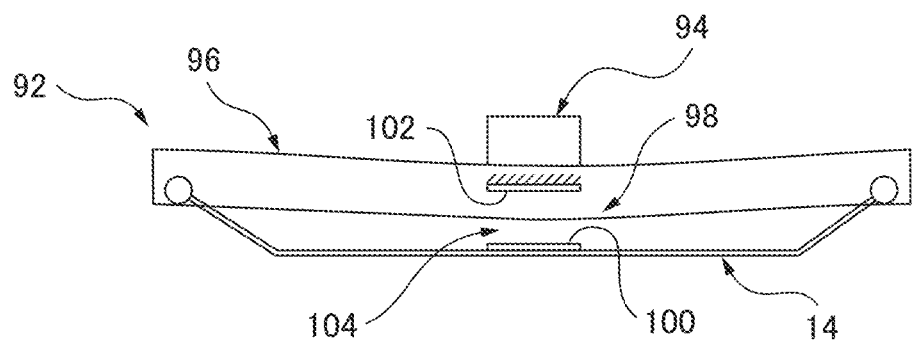
FIG. 13B illustrates a motion of an additional detection structure of the six-axis force sensor of FIG. 11.
Figure 13C:
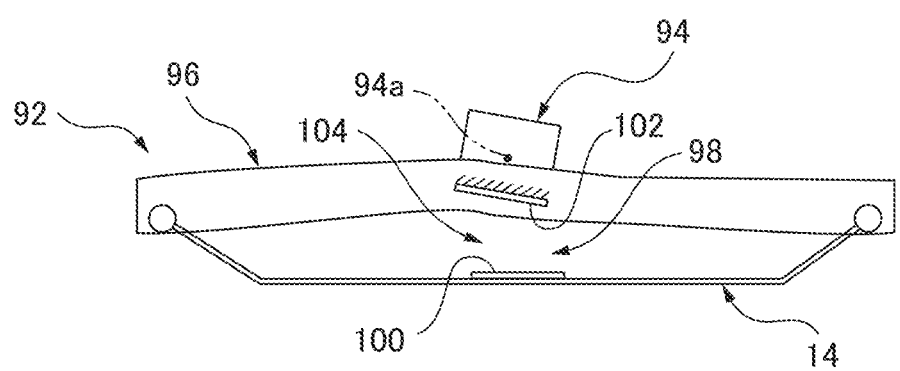
FIG. 13C illustrates a motion of an additional detection structure of the six-axis force sensor of FIG. 11.

FIGS. 13A to 13C schematically illustrate an example of the configuration and operation of the second detecting part 98. In the illustrated example, the second end portion 14 includes a fifth surface 100, the third end portion 94 includes a sixth surface 102 opposed to the fifth surface 100, and a third gap 104 is formed between the fifth surface 100 and the sixth surface 102, the third gap 104 having a dimension which changes in accordance with the relative displacement between the second end portion 14 and the third end portion 94. The second detecting part 98 detects a change in dimension of the third gap 104, and outputs the second detection value D2.

When the second end portion 14 and the third end portion 94 relatively move in the direction along the third axis (Z axis), the dimension of the third gap 104 changes in accordance with the distance of the relative movement (FIGS. 13A and 13B). On the other hand, when the second end portion 14 and the third end portion 94 relatively rotate about a central axis along the second axis (Y axis) (in the illustrated example, a central axis 94a in a rectangular vertical section of the third end portion 94 shaped like a rectangular parallelepiped), the dimension of the third gap 104 changes in accordance with the angle of the relative rotation (FIG. 13C).

Similarly, when the second end portion 14 and the third end portion 94 relatively rotate about a central axis along the first axis (X axis), the dimension of the third gap 104 changes in accordance with the angle of the relative rotation (not illustrated). During the relative movement or rotation, the second end portion 14 and the third end portion 94 do not deform, and only the second connecting portion 96 elastically deforms.

Analogously to the first gap 30 and the second gap 36 of the force-detection structure 10, the third gap 104 has a capacitance, as one example of the constituent element for representing the change in dimension of the third gap 104 by a numerical quantity. Alternatively, it is possible to detect the change in dimension of the third gap 104 by using one of eddy current, magnetic permeance, light quantity, etc.

As described above, the six-axis force sensor 90 has a configuration wherein the first end portion 12 and the second end portion 14 are mutually connected by the connecting portion 16 with a first three-degrees of freedom and the second end portion 14 and the third end portion 94 are mutually connected by the second connecting portion 96 with the second three-degrees of freedom different from the first three-degrees of freedom, and wherein the detecting part 18 detects the relative displacement between the first end portion 12 and the second end portion 14 in the first three-degrees of freedom and the second detecting part 98 different from the detecting part 18 detects the relative displacement between the second end portion 14 and the third end portion 94 in the second three-degrees of freedom. Accordingly, the detecting part 18 and the second detecting part 98 can detect, in a sharing manner, the relative displacement between the first end portion 12 and the third end portion 94 in six degrees of freedom, with the detecting part 18 being allocated to three degrees of freedom and the second detecting part 98 being allocated to the other three degrees of freedom. Since the detecting part 18 and the second detecting part 98 can respectively output, in a sharing manner, the detection value D based on the relative displacement in the first three-degrees of freedom and the second detection value D2 based on the relative displacement in the second three-degrees of freedom, it is possible to improve accuracy in the detection value D and the second detection value D2, used for acquiring three-axis force components and three-axis moment components.

In particular, since the six-axis force sensor 90 includes the force-detection structure 10, even when a constituent element (in particular, a constituent element of the detecting part 18) undergoes a deformation or a characteristic change occurred due to environmental factors other than a force, such as a temperature or humidity, it is possible to detect the first movement data d1, the second movement data d2 and the rotation data d3, which exactly represent a displacement due to the force and thereby improve the accuracy and precision of the detection value D. Although not illustrated, it is also possible to provide for the second detecting part 98 of the additional detection structure 92 with a differential-type displacement detection mechanism analogous to that in the detecting part 18.

While the embodiments of the disclosure have been described, it will be understood, by those skilled in the art, that various changes or modifications may be made thereto without departing from the scope of the following claims.

The invention claimed is:

1. A force-detection structure comprising:
a first end portion;
a second end portion;
a connecting portion that elastically connects the first end portion to the second end portion;
a detecting part that detects a relative displacement between the first end portion and the second end portion, accompanied by elastic deformation of the connecting portion, and outputs, based on the said relative displacement, a detection value used for acquiring a first force component in a direction of a first axis, a second force component in a direction of a second axis orthogonal to the first axis, and a moment component about a third axis orthogonal to both of the first axis and the second axis, of a force applied to the first end portion or the second end portion; wherein the detecting part comprises:
two first gaps provided between the first end portion and the second end portion, and configured to change in accordance with a relative movement between the first end portion and the second end portion;
two second gaps provided between the first end portion and the second end portion at positions different from positions of the two first gaps, and configured to change in accordance with a relative movement between the first end portion and the second end portion;
a first differentially-detecting section that detects, in a differential manner, changes occurring oppositely in phase in the two first gaps in accordance with a relative movement between the first end portion and the second end portion along the first axis as first movement data, by converting the changes to signals mutually reverse in phase and executing arithmetic processing for the signals in a differential manner;
a second differentially-detecting section that detects, in a differential manner, changes occurring oppositely in phase in the two second gaps in accordance with a relative movement between the first end portion and the second end portion along the second axis as second movement data, by converting the changes to signals mutually reverse in phase and executing arithmetic processing for the signals in a differential manner; and
a third differentially-detecting section that detects, in a differential manner, changes occurring oppositely in phase in the first and second gaps in accordance with a relative rotation between the first end portion and the second end portion about a central axis along the third axis as rotation data, by converting the changes to signals mutually reverse in phase and executing arithmetic processing for the signals in a differential manner, so that
the detecting part outputs the detection value based on the first movement data, the second movement data and the rotation data.

2. The force-detection structure of claim 1, further comprising a calculating part that calculates the first force component, the second force component and the moment component, by using the detection value.

3. The force-detection structure of claim 1, wherein the first differentially-detecting section detects the changes in the first gaps by using capacitance, eddy current, magnetic permeance or light quantity.

4. The force-detection structure of claim 1, wherein the second differentially-detecting section detects the changes in the second gaps by using capacitance, eddy current, magnetic permeance or light quantity.

5. The force-detection structure of claim 1, wherein the third differentially-detecting section detects the change in the first gap and the change in the second gap by using capacitance, eddy current, magnetic permeance or light quantity.

6. The force-detection structure of claim 1, wherein the connecting portion includes a plurality of elastic columns extending in a direction along the third axis between the first end portion and the second end portion; and wherein each of the elastic columns elastically deforms, due to the said force applied thereto, in such a manner as to cause the relative movement or the relative rotation between the first end portion and the second end portion.

7. A force sensor comprising the force-detection structure of claim 1.

* * * * *